Feb. 18, 1930. O. C. TRAVER Re. 17,601

PROTECTIVE ARRANGEMENT

Original Filed March 18, 1926

Inventor:
Oliver C. Traver,
by Alexander S. Lunt
His Attorney.

Reissued Feb. 18, 1930 Re. 17,601

UNITED STATES PATENT OFFICE

OLIVER C. TRAVER, OF PENFIELD, PENNSYLVANIA, ASSIGNOR TO GENERAL ELECTRIC COMPANY, A CORPORATION OF NEW YORK

PROTECTIVE ARRANGEMENT

Original No. 1,659,619, dated February 21, 1928, Serial No. 95,757, filed March 18, 1926. Application for reissue filed February 7, 1929. Serial No. 338,306.

My invention relates to improvements in protective arrangements for electric systems and more particularly for systems comprising two parallel lines, especially when these are provided with a differential system of protection involving current transformers which are connected in series for normally circulating current, whereby further protection, such that either line alone may carry as much current as the two together, is provided in an economical and satisfactory manner.

My invention will be better understood from the following description taken in connection with the accompanying drawing, and its scope will be pointed out in the appended claims.

Figure 1:
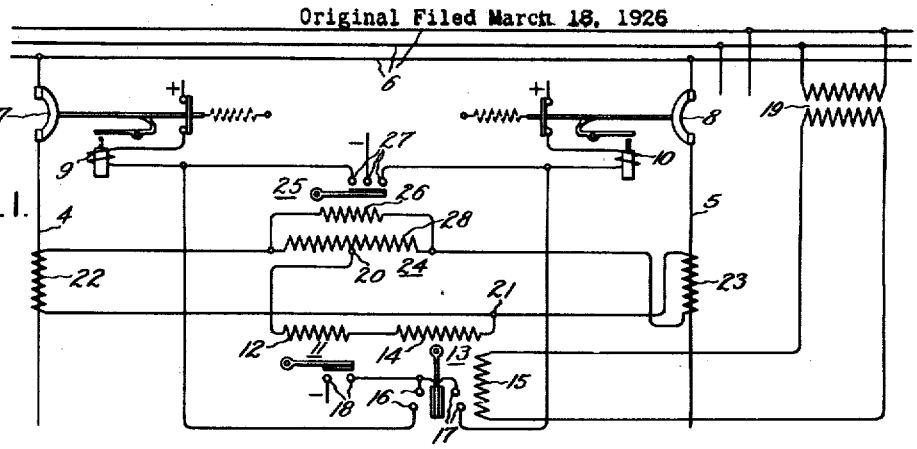
Figure 2:
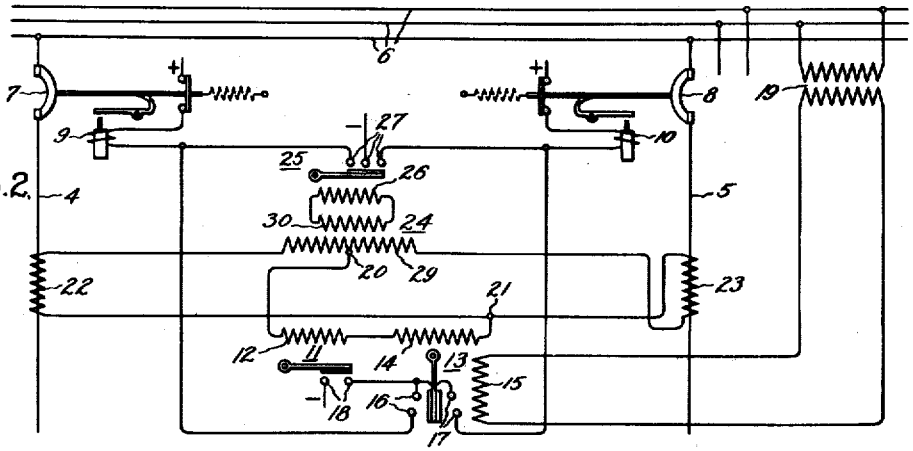
Figure 3:
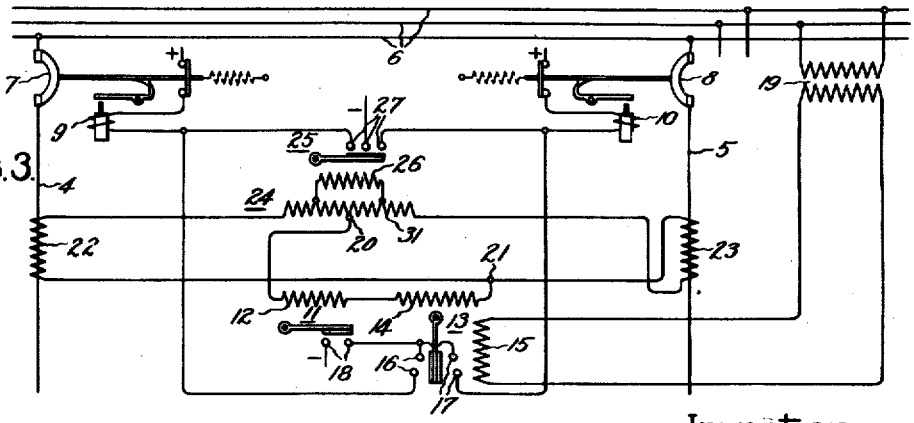

In the accompanying drawing, Fig. 1 illustrates diagrammatically, in single phase for clearness, an embodiment of my invention as applied to two parallel lines provided with a differential system of protection, and Figs. 2 and 3 illustrate diagrammatically, also in single phase, modifications of the embodiment of my invention shown in Fig. 1.

In the several figures of the drawing, two parallel lines, 4 and 5, of which only one phase conductor is shown, are arranged to be connected to a bus through suitable circuit interrupters 7 and 8 having trip coils 9 and 10. For selectively controlling the opening of the circuit interrupters 7 and 8 on the occurrence of faults, there may be provided a differential protective arrangement which is herein shown as comprising an over-current relay 11 having a coil 12 and a directional relay 13 having cooperating current and potential coils 14 and 15 respectively. The directional relay 13 has two sets of contacts, 16 and 17 which are connected in series with the trip coils 9 and 10 respectively and in series with the contacts 18 of the over-current relay 11. The potential coil 15 of the directional relay 13 is arranged to be energized from the bus 6 through a potential transformer 19. In order that the coil 12 of the over-current relay 11 and the current coil 14 of the directional relay 13 may be energized in accordance with the vectorial difference between the currents in corresponding phase conductors of the lines 4 and 5, they are connected between points 20 and 21 of a circuit comprising the secondaries 22 and 23 of current transformers energized respectively from the lines 4 and 5, the secondaries being connected in series for normally circulating current. These points 20 and 21 are so chosen that with the lines 4 and 5 carrying currents in the same direction and the current transformer secondaries 22 and 23 furnishing substantially equal currents, the points are at substantially the same potential and this is what is meant by the expression "normally at substantially the same potential".

A protective arrangement of this type, as is well known, will operate selectively in accordance with the magnitude and direction of the vectorial difference between the currents in the lines 4 and 5 to control the circuit interrupter in the line carrying the greater current. It is frequently desirable, however, to protect the lines 4 and 5, not only in accordance with the vectorial difference between the line currents but also in accordance with the vectorial sum of the line currents, in such a manner that either one of the lines alone, when the other is out of service, may carry as much current as the two lines together without the necessity of readjusting any of the protective apparatus.

In accordance with my invention I accomplish this by an inductive means 24, comprising an inductive winding which is connected in the circulating current circuit of the current transformer secondaries 22 and 23 and which includes at an intermediate point one of the points 20 and 21 in the connection across the normally circulating current circuit. Associated with the inductive means and arranged to be energized therefrom is an electroresponsive device such as an over-current relay 25 which has an energizing coil 26 and which is arranged to control the circuits of the trip coils 9 and 10 through contacts 27.

In Fig. 1, the inductive means 24 is illustrated as a stationary inductive means comprising an inductive winding 28 across which the relay coil 26 is connected. With this arrangement, the relay coil 26 will be energized by a current which is derived from the line currents and which is substantially proportional to the vectorial sum thereof, no matter whether one or both of the lines 4 and 5 is or are in service. Assuming equal currents in the lines 4 and 5, then a current proportional to that of each of the lines will tend to circulate in the circuit including the current transformer secondaries 22 and 23 and the inductive winding 28, but no current will flow in the connection between the points 20 and 21, since they have substantially the same potential under the conditions assumed. Consequently, the inductive winding 28 acts in effect as a reactor and a current substantially equal to one-half of the sum of the currents in the current transformer secondaries 22 and 23, that is, proportional to the sum of the line currents, appears in the relay coil 26. When this current exceeds that for which the relay 25 is set to operate, both of the circuit interrupters 7 and 8 will be tripped. If the current in one line, for example, line 4, is greater than the current in the line 5, then a current proportional to the current in the line 4 tends to flow through one-half of the inductive winding 28 while a current proportional to the current in the line 5 tends to flow through the other half in the same direction. The difference between these currents appears in the connection between the points 20 and 21, since they are not at substantially the same potential. One-half of this difference flows in one direction in one-half of the winding 28 and the other half of the difference flows in the opposite direction in the other half of the winding 28. Consequently this winding 28 acts in effect as a reactor and a current substantially equal to one-half of the vectorial sum of the currents in the current transformer secondaries 22 and 23 appears in the relay coil 26 and the circuit interrupters 7 and 8 will be tripped when this current exceeds the predetermined value for which the relay is set to operate. If one line, for example, line 5, is out of service, then the inductive winding 28 acts in effect as an auto-transformer with a 1 to 2 turn ratio, one-half of the winding being energized by a current proportional to the current in the line 4 and acting as the common winding while the other half of the winding acts as the series winding. Consequently the current in the relay coil 26 is substantially proportional to the vectorial sum of the currents in the two lines, since the current in line 5 is, by assumption, zero. In this case, when the current in the relay coil 26 exceeds the predetermined value, the circuit interrupter 7 will be tripped. Thus the relay 25 is always energized by a current proportional to the vectorial sum of the line currents, whether one or two lines are in service and therefore either line, when in service alone, may be operated at substantially the same current as the two lines together without changing the relay adjustment.

In the previous cases of operation discussed, it has been assumed that the currents in the two lines are in the same direction, but the relative direction of these currents is immaterial so far as energizing the relay 25 by a current proportional to the vectorial sum of the line currents is concerned. Thus assuming, that each of the lines is carrying the same current but that these currents are flowing in opposite directions, then the inductive winding 28 acts in effect as a balanced end reactor, that is a current proportional to the current in the line 4 flows in one direction in one-half of the winding 28 and an equal current proportional to the current in the line 5 flows in the opposite direction in the other half of the winding 28. These currents combine and flow through the connection between the points 20 and 21 and the inductance of the winding 28 is substantially zero, so that substantially no current flows in the relay coil 26. This is as it should be, for the vectorial sum of two equal and opposite currents, as assumed, is zero.

In Fig. 2, the inductive means 24 is illustrated as mutually inductive in the form of a transformer whose primary 29 is connected in the same manner as the inductive winding 28 of Fig. 1, as heretobefore described, and whose secondary 30 has in circuit therewith the relay coil 26. With this arrangement, if we assume, for example, that the ratio of the turns in the winding 29 to the turns in the winding 30 is 2 to 1, then the relay coil 26 will be energized by a current which is substantially equal to the vectorial sum of the currents in the secondaries of the current transformers 22 and 23. This will readily be understood, since one half of the winding 29 will be energized by a current substantially equal to the current in the current transformer secondary 22 and the other half by a current substantially equal to the current in the current transformer secondary 23. The resultant effect of the winding 29 is therefore substantially equal to one-half the vectorial sum of the currents in the current transformer secondaries 22 and 23, that is proportional to the vectorial sum of the line currents. This resultant effect or sum, by reason of the transformation ratio assumed, appears in the secondary winding 30, and therefore the relay coil 26, as a current substantially equal to the vectorial sum of the currents in the current transformer secondaries 22 and 23, that is, proportional to the vectorial sum of the line currents.

In Fig. 3, the inductive means 24 is illustrated as comprising the winding 31 connected in the same manner as the inductive winding 28 of Fig. 1, as heretofore described. In this modification, the relay coil 26 is shown as connected between the quarter points of the inductive winding 31. This winding acts in effect as a 1 to 2 turn ratio auto-transformer, one half of the winding being energized by a current substantially equal to the current in the current transformer secondary 22 and the other half by a current substantially equal to the current in the current transformer secondary 23. The resultant effect of the whole winding is therefore substantially equal to one-half of the vectorial sum of the currents in the current transformer secondaries 22 and 23 and by reason of the turn ratio assumed, the current appearing in the relay coil 26 is twice as great so that the relay 25 is energized by a current substantially proportional to the vectorial sum of the line currents whether one or both lines is or are in service.

Protective means embodying my invention is of particular value where differential protection involving current transformers connected in series for normally circulating current is provided and it is desired to provide additional protection such that either of two parallel lines alone may carry as much current as the two together and the vectorial sum carried at any time should not exceed a predetermined value. This protective means is very simply and economically provided, since there is required but one additional inductive device and a relay whose adjustment does not have to be altered to correspond to the lines in service.

While I have shown and described my invention and one application thereof in considerable detail, I do not desire to be limited to the exact arrangements and application shown, but seek to cover in the appended claims all those modifications that fall within the true spirit and scope of my invention.

What I claim as new and desire to secure by Letters Patent of the United States is:—

1. Protective means for controlling two parallel lines whereby either line alone may carry as much current as the two lines together, comprising current transformers respectively connected to be energized from the lines, a circuit comprising the secondaries of the current transformers connected in series for normally circulating current, an inductive winding connected in series in said circuit, a connection from the midpoint of said winding to another point of said circuit normally at substantially the same potential, and a relay having a coil connected across said inductive winding, the construction and arrangement of parts being such that the relay is energized by a current substantially proportional to the vectorial sum of the line currents.

2. In a protective arrangement for an electric system wherein two parallel lines are arranged to be controlled by circuit interrupters, means for controlling the operation of said interrupters comprising a relay and means for energizing the relay by a current derived from the line currents and substantially proportional to the vectorial sum thereof, comprising current transformers respectively connected to be energized from the lines, a circuit comprising the secondaries of the current transformers connected in series for normally circulating current, an inductive winding connected in series in said circuit, a connection across said circuit from an intermediate point in said winding, said relay having a coil connected across said inductive winding.

3. A protective arrangement for two parallel lines comprising current transformers respectively connected to be energized from the lines, a circuit comprising the secondaries of the current transformers connected in series for normally circulating current, an inductive winding connected in series in said circuit, a connection from an intermediate point of said winding to another point of said circuit normally at substantially the same potential, and a relay having a single energizing coil which is connected to be energized from said inductive winding.

4. Protective means for controlling two parallel lines whereby either line alone may carry as much current as the two lines together comprising a relay and means for energizing said relay by a current derived from the line currents and substantially proportional to the vectorial sum thereof comprising current transformers respectively connected to be energized from the lines, a circuit comprising the secondaries of the current transformers connected in series for normally circulating current, stationary inductive means having a winding connected in series in said circuit, and a connection from the midpoint of said winding to another point on said circuit normally at substantially the same potential, said relay having a coil connected in circuit with said inductive means.

5. A protective arrangement for two parallel lines comprising current transformers respectively connected to be energized from the lines, a circuit comprising the secondaries of the current transformers connected in series for normally circulating current, stationary inductive means having a winding connected in series in said circuit, a connection from an intermediate point of said winding to another point on the other side of said circuit normally at substantially the same potential, and an electroresponsive device having a single energizing coil connected to be energized from said inductive means.

6. A protective arrangement for two parallel lines comprising transformers respectively connected to be energized from the lines, a circuit comprising the secondaries of the transformers connected in series, inductive means comprising a winding connected in said circuit, a connection across said circuit from an intermediate point of said winding, and an electroresponsive device having a single energizing coil connected to be energized from said inductive means.

7. In combination with two electric circuits and a circuit interrupter for each, means for selectively controlling the opening of the circuit interrupter in a faulty circuit and for controlling the opening of said circuit interrupters simultaneously including current transformers respectively connected to be energized from said circuits, a differential protective circuit including the secondaries of said transformers, a relay having a winding connected in series relation with said protective circuit and a relay having a winding connected in shunt relation with said protective circuit.

8. In combination with two electric circuits and a circuit interrupter for each, means for selectively controlling the opening of the circuit interrupter in the circuit carrying the greater current when the difference between the circuit currents exceeds a predetermined value and for controlling the opening of the circuit interrupters when the sum of the circuit currents exceeds a predetermined value including transformers respectively connected to be energized from said circuits, a differential protective circuit including the secondaries of said transformers, inductive means connected in said protective circuit, a relay having a winding connected to be energized from said inductive means and a relay having a winding connected to be energized directly from said protective circuit.

9. In combination with two parallel lines and a circuit interrupter for each line, means for selectively controlling the opening of the circuit interrupter in the line carrying the greater current when the difference between the line currents exceeds a predetermined value and for controlling the opening of said circuit interrupters when the sum of the line currents exceeds a predetermined value including current transformers respectively connected to be energized from said lines, a differential protective circuit including the secondaries of said transformers, an inductive winding connected in said circuit, a connection across said circuit from an intermediate point of said winding, a relay having a winding in series relation with said connection, and a relay connected to be energized from said inductive winding.

10. In combination with two parallel lines and a circuit interrupter for each line, means for selectively controlling the opening of the circuit interrupter in the line carrying the greater current when the difference between the line currents exceeds a predetermined value and for controlling the opening of said circuit interrupters when the sum of the line currents exceeds a predetermined value including current transformers respectively connected to be energized from said line, a differential protective circuit including the secondaries of said transformers, inductive means including a winding connected in series in said circuit, a connection across said circuit from an intermediate point of said winding, a relay having a winding in series relation with said connection and a relay connected to be energized from said inductive means.

In witness whereof, I have hereunto set my hand this twenty-third day of January, 1929.

OLIVER C. TRAVER.

CERTIFICATE OF CORRECTION.

Reissue Patent No. 17,601. Granted February 21, 1930, to

OLIVER C. TRAVER.

It is hereby certified that error appears in the printed specification of the above numbered patent requiring correction as follows: Page 4, line 33, claim 8, after the word "including" insert the word "current"; and that the said Letters Patent should be read with this correction therein that the same may conform to the record of the case in the Patent Office.

Signed and sealed this 18th day of March, A. D. 1930.

(Seal)

M. J. Moore,
Acting Commissioner of Patents.